Patented Dec. 2, 1941

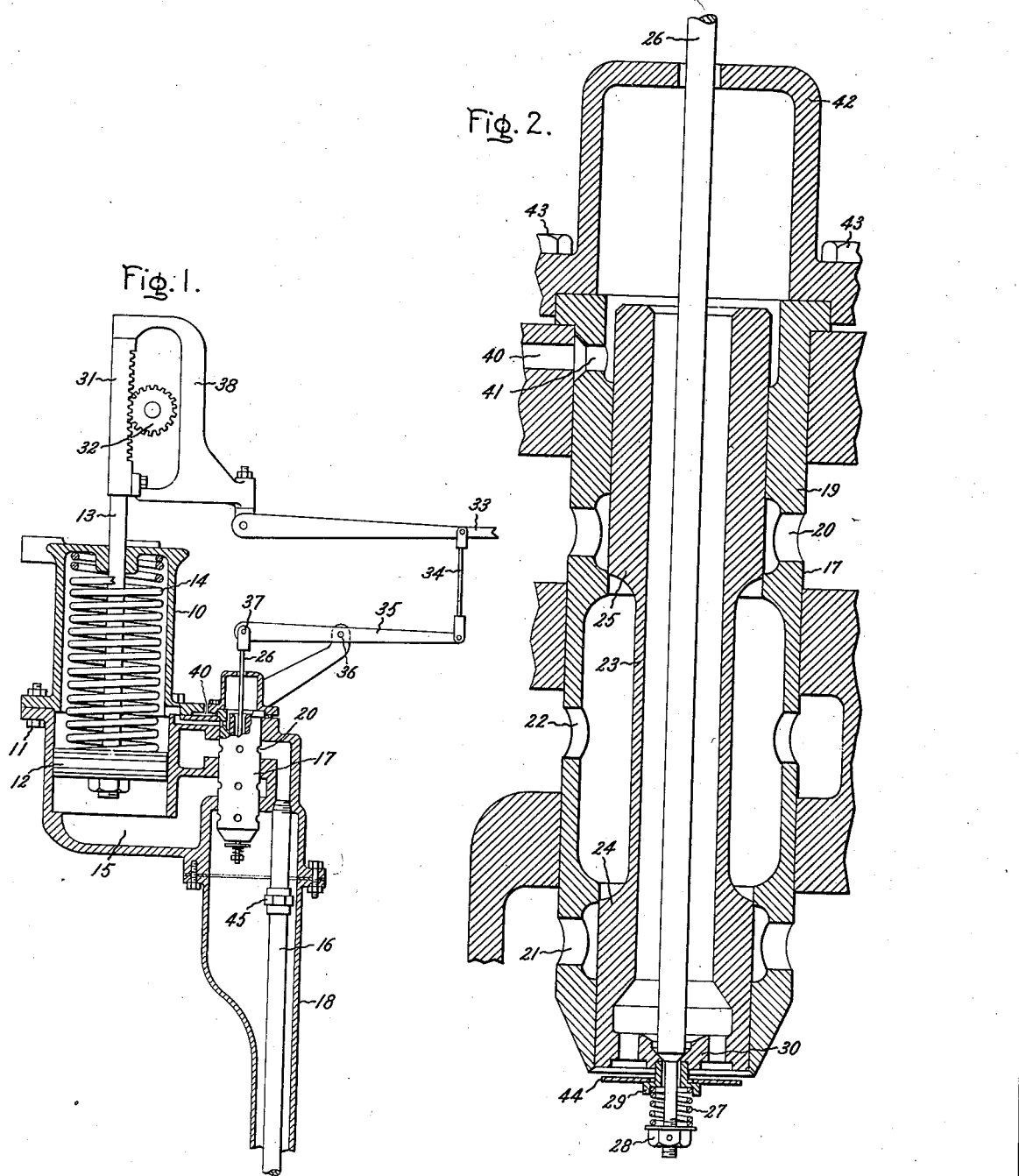

2,264,833

UNITED STATES PATENT OFFICE 2,264,833

VALVE MEANS FOR HYDRAULIC GOVERNING MECHANISM

Franklin R. Ericson, Marblehead, Mass., assignor to General Electric Company, a corporation of New York Application August 31, 1940, Serial No. 355,069

3 Claims. (Cl. 121—42)

The present invention relates to valve means for hydraulic governing mechanism in which operating fluid, such as oil, is conducted to a pilot valve and hydraulic motor and discharged therefrom by means of a conduit system in which the supply conduits are surrounded or enclosed by the drain conduits. A system of this kind is disclosed in the patent to R. J. Caughey 2,124,395 issued on July 19, 1938, and assigned to the same assignee as the present application. More specifically, the invention relates to an arrangement in which the pilot valve is of the hollow cylinder type and has an end portion enclosed by the drain conduit.

The object of my invention is to provide an improved construction and arrangement of valve means for hydraulic governing mechanisms of the type above set forth whereby fire hazard due to leakage or breaking of the oil supply conduit in proximity to the pilot valve is substantially reduced For a consideration of what I believe to be novel and my invention, attention is directed to the following specification and the claims appended thereto in connection with the accompanying drawing.

In the drawing, Fig. 1 illustrates a governing mechanism embodying my invention, and Fig. 2 is an enlarged detailed view of a part of Fig. 1.

The arrangement comprises an hydraulic motor having a cylinder 10 with flanged upper and lower portions joined and secured together by bolts 11. A piston 12 is slidably disposed in the cylinder and connected to a stem 13. The piston is biased in a downward direction by a compression spring 14 surrounding the stem 13. The space below the piston in the cylinder 10 forms a pressure chamber 15 to which operating fluid, such as oil under pressure, is conducted by means of an oil supply pipe or conduit 16 and a pilot valve 17. Oil drained from the chamber 15 through the pilot valve 17 is discharged through a drain pipe or conduit 18 surrounding in spaced relation the supply conduit 16 and enclosing an end portion of the pilot valve 17.

The pilot valve 17 has a casing 19 forming inlet ports 20 communicating with the supply pipe 16, drain ports 21 communicating with the drain conduit 18, and connecting ports 22 communicating with pressure chamber 15. The communication between the connecting ports 22 and the supply and drain ports 20 and 21 is controlled by a hollow cylinder type valve member 23 which forms a lower head 24 and upper head 25 for controlling the flow of operating fluid through the ports 21 and 20 respectively. In the normal position, as shown in the drawing, the valve heads 24 and 25 register with the ports 21 and 20 respectively, thereby preventing the flow of fluid therethrough. Upon downward movement of the hollow valve member 23, the valve head 24 opens the port 21, thereby permitting the discharge of fluid from the pressure chamber 15 through the connecting port 22 and the drain port 21 into the drain conduit 18. Vice versa, upon upward movement of hollow valve member 23, fluid under pressure may be supplied from the supply pipe 16 through the supply port 20 and connecting port 22 to the pressure chamber 15.

Movement of the hollow valve member is effected by means of a stem 26 centrally projecting through the hollow valve member 23 and yieldingly secured at its lower end to the lower end of the hollow valve member 23 by means of a compression spring 27 adjustably held between a nut 28 and a spring plate 29. The spring plate 29 bears against a perforated bottom 30 of the hollow valve member 23.

The upper end of the hydraulic motor stem 13 is provided with a rack 31 meshing with a gear 32 for controlling a valve operating cam shaft or like element to be controlled. The pilot valve 17 is controlled in conventional manner by a control and follow up lever 33 which has a right hand end portion for connection to a speed governor or like controlling element, not shown. An intermediate portion of the lever 33 is connected by a link 34 to the right hand end of a lever 35 held on a fulcrum 36 and connected to the pilot valve stem 26 by a pivot 37. Upon downward movement of the right hand end of the lever 33, the pilot valve stem 26 is moved upward. Upward movement of the pilot valve, as pointed out above, permits the supply of operating fluid through the ports 20 and 22 to the pressure chamber 15 whereby the piston 12 is moved upward against the biasing force of the spring 14. In order to effect follow-up action of the pilot valve to its normal position in response to movement of the motor piston 12, the left hand portion of the lever 33 is connected by an arm 38 to the rack 31. With this arrangement, upward movement of the rack 31 effects upward turning movement of the lever 33 about its right hand end and counterclockwise turning movement of the lever 35 about the fulcrum 36, thus moving the pilot valve downward towards its normal position in which the valve heads are in line with the ports 20 and 21.

During operation, some of the oil leaks from the pressure chamber 15 past the piston 12 into the upper cylinder portion whence it is discharged through a port 40 in the wall of the cylinder 10 and a port 41 in the wall of the pilot valve casing to the upper end of the hollow valve member 23, to drain leakage through the bore of the latter. Thus, normally the hollow bore acts as a drain passage for leakage fluid. The drain passage also takes care of leakage from the pressure port 20 upward along the sliding fit between the valve head 25 and the casing. The upper end of the pilot valve is enclosed by a cup 42 secured to pilot valve casing 19 by bolts 43.

Difficulties have heretofore been experienced with this kind of arrangement upon leakage from or breaking of the supply pipe 16. If leakage from the supply pipe 16 occurs in substantial quantity pressure is built up in the return pipe 18 and the leakage fluid is forced upward thus flowing back into the drain passage, filling instantly the hollow valve member 23, and thereby causing overflow from the upper open end thereof through the clearance formed between the cup 42 and the stem 26. Leakage oil from the upper end of the pilot valve may come into contact with heated machine parts in the power plant and thereby constitute a serious cause of fire hazard.

In order to eliminate, or at least substantially reduce, such danger, I provide in accordance with my invention means whereby the opening in the hollow valve member 23 is automatically closed by the action of the pressure of leakage fluid discharged from the supply pipe towards the lower end of the hollow valve member. This means in the present example is in the form of a closure plate or ring 44 adjacent the bottom of the hollow valve member 23 and loosely supported on the spring plate 29. The projecting plate 44 has a diameter slightly smaller than the outer diameter of the lower valve head 24 to avoid interference with the upward movement of the hollow valve member 23.

During operation pressure built up in the drain pipe 18 due to leakage of the supply pipe 16 acts towards the plate 44 and forces the latter upward against the bottom of the hollow valve member, thus closing the perforations in the bottom 30 and preventing the overflow of leakage oil through the pilot valve member 23 into the open power plant space. Heretofore, it has been found necessary to provide drain pipes of a cross-sectional area considerably larger than twice the cross-sectional area of the supply pipe in order to preclude the building up of considerable pressure during leakage of the supply pipe. With the provision of the above-mentioned protecting plate 44, it has been possible considerably to reduce the size of drain pipe 18. The plate 44 broadly constitutes a check valve normally permitting draining of fluid from the hollow valve member 23 and preventing back flow into the valve member 23 upon a predetermined excessive back pressure in the drain pipe. The plate 44 is instantly moved towards closing position if the leakage from the supply pipe takes place in the form of a stream or jet directed towards the lower face of the plate 44.

What I claim as new and desire to secure by Letters Patent of the United States is:

1. Hydraulic governing mechanism comprising a motor, a pilot valve for controlling the flow of fluid to and the discharge of fluid from the motor, a fluid supply and drain system connected to the pilot valve and having a supply pipe and a drain pipe enclosing the supply pipe and an end portion of the pilot valve, the pilot valve having a movable hollow valve member, and means to prevent overflow of leakage fluid from the supply pipe through the hollow valve member, said means comprising an element associated with the hollow valve member and actuated by the leakage fluid.

2. A pilot valve having a casing formed with ports, a hollow valve cylinder type member having heads disposed in the casing in cooperative relation with the ports, a stem centrally disposed within the hollow valve member, means including a yieldable member for connecting the lower end portion of the stem to the valve member, and a plate loosely supported on the lower end portion of the stem for closing the hollow valve member to prevent the upward flow of fluid through the hollow valve member.

3. A pilot valve having a casing with ports, a movable valve member disposed in the casing and having heads integral with the member for cooperation with the ports, the valve member having a central bore normally acting as a drain passage for fluid, and means including a closure plate loosely held on the lower end of the valve member for closing the bore by the application of fluid pressure on the lower surface of the plate to prevent back flow of fluid through the bore.

FRANKLIN R. ERICSON.